(12) United States Patent
Jacobsen et al.

(10) Patent No.: US 8,736,516 B2
(45) Date of Patent: May 27, 2014

(54) BLUETOOTH OR OTHER WIRELESS INTERFACE WITH POWER MANAGEMENT FOR HEAD MOUNTED DISPLAY

(75) Inventors: Jeffrey J. Jacobsen, Hollister, CA (US); Christopher Parkinson, Richland, WA (US); Stephen A. Pombo, Campbell, CA (US)

(73) Assignee: Kopin Corporation, Westborough, MA (US)

( * ) Notice: Subject to any disclaimer, the term of this patent is extended or adjusted under 35 U.S.C. 154(b) by 196 days.

(21) Appl. No.: 13/232,622

(22) Filed: Sep. 14, 2011

(65) Prior Publication Data

US 2012/0235896 A1 Sep. 20, 2012

Related U.S. Application Data

(60) Provisional application No. 61/384,543, filed on Sep. 20, 2010.

(51) Int. Cl.
*G09G 5/00* (2006.01)
(52) U.S. Cl.
USPC ................................ 345/7; 345/156; 348/115
(58) Field of Classification Search
USPC .......................................... 345/7–9, 156–184
See application file for complete search history.

(56) References Cited

U.S. PATENT DOCUMENTS

| | | | |
|---|---|---|---|
| 5,990,793 A | 11/1999 | Bieback | |
| 6,010,216 A | 1/2000 | Jesiek | |
| 6,108,197 A | 8/2000 | Janik | |
| 6,204,974 B1 | 3/2001 | Spitzer | |
| 6,325,507 B1 | 12/2001 | Jannard | |
| 6,798,391 B2 | 9/2004 | Peterson, III | |
| 6,853,293 B2 | 2/2005 | Swartz et al. | |
| 6,900,777 B1 | 5/2005 | Hebert et al. | |
| 6,922,184 B2 | 7/2005 | Lawrence et al. | |
| 6,956,614 B1 | 10/2005 | Quintana et al. | |
| 6,966,647 B2 | 11/2005 | Jannard et al. | |
| 7,004,582 B2 | 2/2006 | Jannard et al. | |
| 7,013,009 B2 | 3/2006 | Warren | |
| 7,082,393 B2 | 7/2006 | Lahr | |
| 7,147,324 B2 | 12/2006 | Jannard et al. | |
| 7,150,526 B2 | 12/2006 | Jannard et al. | |
| 7,213,917 B2 | 5/2007 | Jannard et al. | |
| 7,216,973 B2 | 5/2007 | Jannard et al. | |
| 7,219,994 B2 | 5/2007 | Jannard et al. | |
| 7,231,038 B2 | 6/2007 | Warren | |
| 7,249,846 B2 | 7/2007 | Grand et al. | |

(Continued)

FOREIGN PATENT DOCUMENTS

| | | |
|---|---|---|
| WO | WO 95/21408 | 8/1995 |
| WO | WO 95/23994 | 9/1995 |

(Continued)

OTHER PUBLICATIONS

International Search Report and Written Opinion of PCT/US2011/051760 dated Jan. 31, 2012.

*Primary Examiner* — Premal Patel
(74) *Attorney, Agent, or Firm* — Hamilton, Brook, Smith & Reynolds, P.C.

(57) ABSTRACT

A Head Mounted Display (HMD) system that includes a wireless front end that interprets spoken commands and/or hand motions and/or body gestures to selectively activate subsystem components only as needed to carry out specific commands.

17 Claims, 7 Drawing Sheets

(56) References Cited

U.S. PATENT DOCUMENTS

| | | |
|---|---|---|
| 7,278,734 B2 | 10/2007 | Jannard et al. |
| 7,331,666 B2 | 2/2008 | Swab et al. |
| 7,445,332 B2 | 11/2008 | Jannard et al. |
| 7,452,073 B2 | 11/2008 | Jannard et al. |
| 7,458,682 B1 | 12/2008 | Lee |
| 7,461,936 B2 | 12/2008 | Jannard |
| 7,494,216 B2 | 2/2009 | Jannard et al. |
| 7,512,414 B2 | 3/2009 | Jannard et al. |
| 7,620,432 B2 | 11/2009 | Willins et al. |
| 7,682,018 B2 | 3/2010 | Jannard |
| 7,740,353 B2 | 6/2010 | Jannard |
| 7,744,213 B2 | 6/2010 | Jannard et al. |
| 7,753,520 B2 | 7/2010 | Fuziak, Jr. |
| 7,760,898 B2 | 7/2010 | Howell et al. |
| 7,798,638 B2 | 9/2010 | Fuziak, Jr. |
| 7,806,525 B2 | 10/2010 | Howell et al. |
| 7,919,556 B2 | 4/2011 | Lewis |
| 7,959,084 B2 | 6/2011 | Wulff |
| 7,966,189 B2 | 6/2011 | Le et al. |
| 7,967,433 B2 | 6/2011 | Jannard et al. |
| 7,969,383 B2 | 6/2011 | Eberl et al. |
| 7,969,657 B2 | 6/2011 | Cakmakci et al. |
| 7,976,480 B2 | 7/2011 | Grajales et al. |
| 7,988,283 B2 | 8/2011 | Jannard |
| 7,997,723 B2 | 8/2011 | Pienimaa et al. |
| 8,010,156 B2 | 8/2011 | Warren |
| 8,072,393 B2 | 12/2011 | Riechel |
| 8,092,011 B2 | 1/2012 | Sugihara et al. |
| 8,098,439 B2 | 1/2012 | Amitai et al. |
| 8,123,352 B2 | 2/2012 | Matsumoto et al. |
| 8,140,197 B2 | 3/2012 | Lapidot et al. |
| 8,212,859 B2 | 7/2012 | Tang et al. |
| 2002/0015008 A1 | 2/2002 | Kishida et al. |
| 2002/0094845 A1 | 7/2002 | Inasaka |
| 2003/0068057 A1 | 4/2003 | Miller et al. |
| 2005/0264527 A1 | 12/2005 | Lin |
| 2006/0132382 A1 | 6/2006 | Jannard |
| 2008/0198324 A1 | 8/2008 | Fuziak |
| 2008/0300886 A1* | 12/2008 | Patch .......................... 704/275 |
| 2009/0128448 A1 | 5/2009 | Riechel |
| 2009/0154719 A1 | 6/2009 | Wulff et al. |
| 2009/0180195 A1 | 7/2009 | Cakmakci et al. |
| 2009/0197615 A1* | 8/2009 | Kim et al. .................. 455/456.1 |
| 2009/0217211 A1* | 8/2009 | Hildreth et al. ................ 715/863 |
| 2009/0320073 A1 | 12/2009 | Reisman |
| 2010/0020229 A1 | 1/2010 | Hershey et al. |
| 2010/0033830 A1 | 2/2010 | Yung |
| 2010/0053069 A1 | 3/2010 | Tricoukes et al. |
| 2010/0079356 A1* | 4/2010 | Hoellwarth ...................... 345/8 |
| 2010/0121480 A1 | 5/2010 | Stelzer et al. |
| 2010/0171680 A1 | 7/2010 | Lapidot et al. |
| 2010/0238184 A1 | 9/2010 | Janicki |
| 2010/0271587 A1 | 10/2010 | Pavlopoulos |
| 2010/0277563 A1 | 11/2010 | Gupta et al. |
| 2010/0289817 A1 | 11/2010 | Meier et al. |
| 2011/0001699 A1 | 1/2011 | Jacobsen et al. |
| 2011/0089207 A1 | 4/2011 | Tricoukes et al. |
| 2011/0090135 A1 | 4/2011 | Tricoukes et al. |
| 2011/0214082 A1 | 9/2011 | Osterhout et al. |

FOREIGN PATENT DOCUMENTS

| | | |
|---|---|---|
| WO | WO 00/79327 | 12/2000 |
| WO | WO 2009/076016 | 6/2009 |
| WO | WO 2011/051660 | 5/2011 |
| WO | WO 2012/040386 | 3/2012 |

* cited by examiner

| Input | Devices Enabled | Devices Disabled |
|---|---|---|
| Incoming call | Audio in/out | OMAP<br>Display<br>Motion track<br>Camera<br>WLAN modem |
| "read todo list" spoken | Audio in/out<br>OMAP | Display<br>Camera<br>WLAN modem<br>Motion track |
| "view nytimes.com" spoken | Audio in/out<br>OMAP<br>Display<br>WLAN modem | Camera<br>Motion track |
| Hand gesture | Audio in/out<br>OMAP<br>Camera<br>Display | WLAN modem<br>Motion track |
| Head movement | Motion track<br>Display<br>OMAP | Audio in/out<br>Camera<br>WLAN modem |
| "sleep" spoken | Audio in | Audio out<br>Camera<br>Display<br>OMAP<br>Motion track<br>WLAN modem |

FIG. 7

BLUETOOTH OR OTHER WIRELESS INTERFACE WITH POWER MANAGEMENT FOR HEAD MOUNTED DISPLAY

RELATED APPLICATION

This application claims the benefit of U.S. Provisional Application No. 61/384,543, filed on Sep. 20, 2010. The entire teachings of the above application(s) are incorporated herein by reference.

TECHNICAL FIELD

The present disclosure relates to a head mounted display (HMD) system or other video eyewear apparatus having a wireless front end that controls the activation of other system components.

BACKGROUND OF THE INVENTION

Recently developed microdisplays can provide large format, high resolution color pictures and streaming video in a very small form factor. One use for such displays is in a head mounted display (HMD) apparatus worn on the user's face or head similar to a pair of eyeglasses or headphones. The electronics enclosed in such devices have become extremely sophisticated and can now include integrated data processors, wireless interfaces, and other input devices such as head tracking accelerometers, cameras, voice recognition circuits and software and other components.

SUMMARY OF THE INVENTION

In a preferred environment, a head mounted display (HMD) system includes a high resolution microdisplay, microphone(s) and speaker(s), auxiliary interfaces such as wireless interfaces, wireless network interfaces, cameras (visible, infrared, etc.), audio devices, keypads, game controller devices and other peripherals.

A wireless interface, such as a Bluetooth, WiFi, cellular or other wireless interface, becomes a front end for the system and controls when the other system components are activated. When the HMD system is first switched on it can act with minimal functionality such as similar to a Bluetooth headset to provide only speaker and microphone functions. A paired device, such as a Bluetooth compatible mobile phone (i.e., an Apple iPhone or Google Android Smartphone) can be used to feed and be fed audio conversations in a hands free mode. In this mode, other functions of the HMD system remain in hibernation mode until a verbal command is recognized by the headset that wakes up other system components and functionality.

For example, when the Bluetooth front end detects an incoming data stream with a certain audio component, the audio component is passed to a voice recognition function embodied as a circuit or software. If the voice recognition function determines the audio component is a verbal command to the system that requires video output, the front end will cause the embedded data processor to turn on any other peripheral devices such as the video display. When the video display is no longer needed, the processor and video driver circuitry are placed back in sleep mode.

In another example, the user may speak a command that requires more sophisticated functionality of the onboard processor. For example, the user may request the reading a list of today's "to do" tasks. The list may be generated by an application program such as Microsoft Outlook running on a host computer. Carrying out this command requires not only waking up the embedded processor to access a local mass storage device to fetch the to do list information but also text to speech circuitry that generates an audio signal that corresponds to the spoken words.

In another example, the user may request viewing an agenda document that was attached as a Microsoft Word document to a webmail message. This may require the embedded processor to wake up, activate the local microdisplay, and make a connection to an external network, such as through a Bluetooth, Wireless Local Area Network (WLAN) circuit and/or cellular modem circuit. Those circuits will then only be energized at that point. The embedded processor then contacts a host machine, such as a Personal Computer, to retrieve and display the web information.

In order to support this functionality, the wireless front end has contained therein a table or other logic that enables it to not only perform speech to text functions, or convert gestures to text, but then to interpret these voice or gesture commands and consult a list of components that require energizing to carry out the spoken or gesture commands.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 7 is a list of spoken commands, gesture commands or head motion commands and those portions of the subsystem that are activated.

DETAILED DESCRIPTION OF PREFERRED EMBODIMENTS

A description of example embodiments follows.

Figure 1:
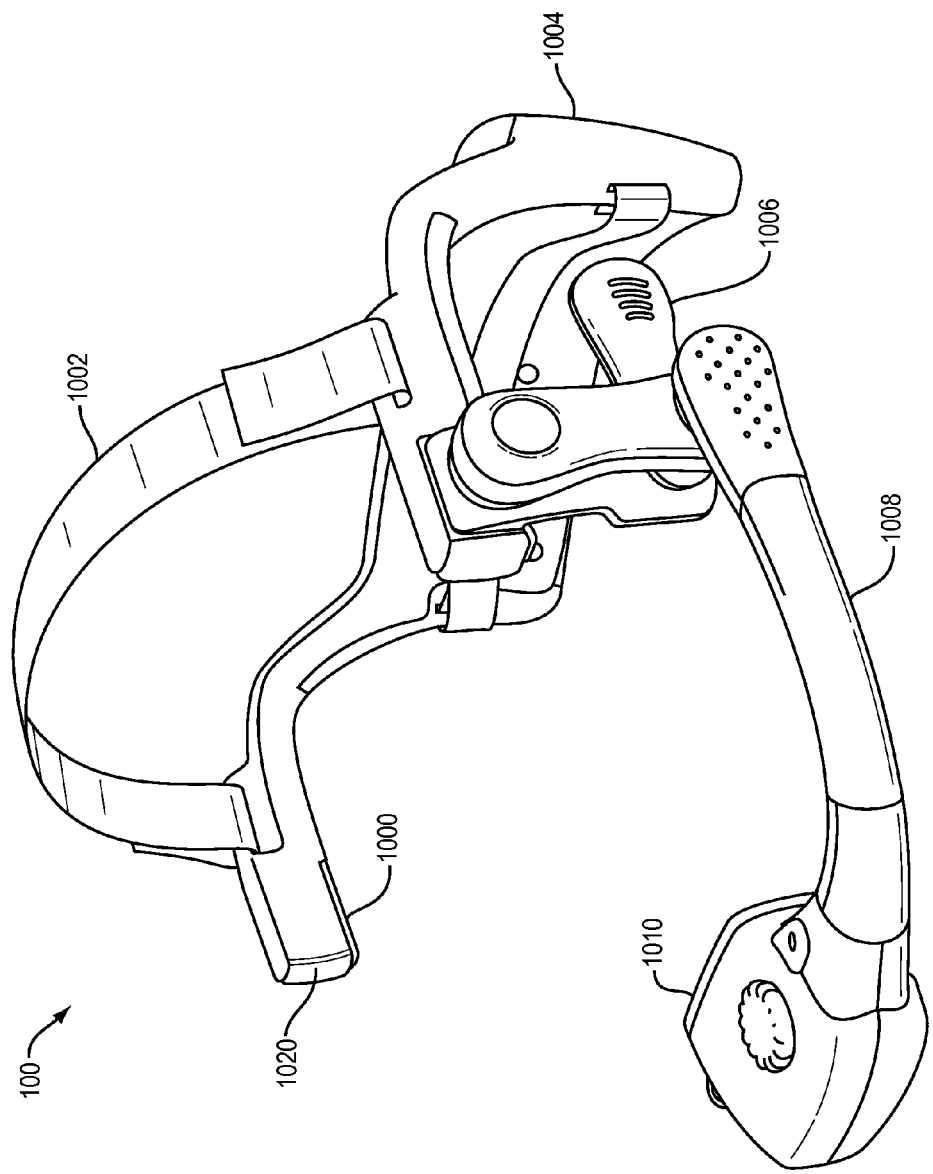
FIG. 1 is a head mounted display (HMD) system that includes a microdisplay as well as other peripheral interfaces.

FIG. 1 shows a head mounted display (HMD) system 100 that generally includes a frame 1000, a strap 1002, a back section 1004, a speaker 1006, cantilever or arm 1008 and microdisplay subassembly 1010.

The HMD 100 may be based on Golden-i™ hands free communication and control device available from Kopin Corporation of Taunton, Mass. One side of the device, particularly the side opposite the microdisplay subassembly 1010, may include a "hot shoe" peripheral port 1020 that can provide corresponding connections to accessories, as explained further below, so that a user can remove the attached various components to the HMD 100.

Figure 2:
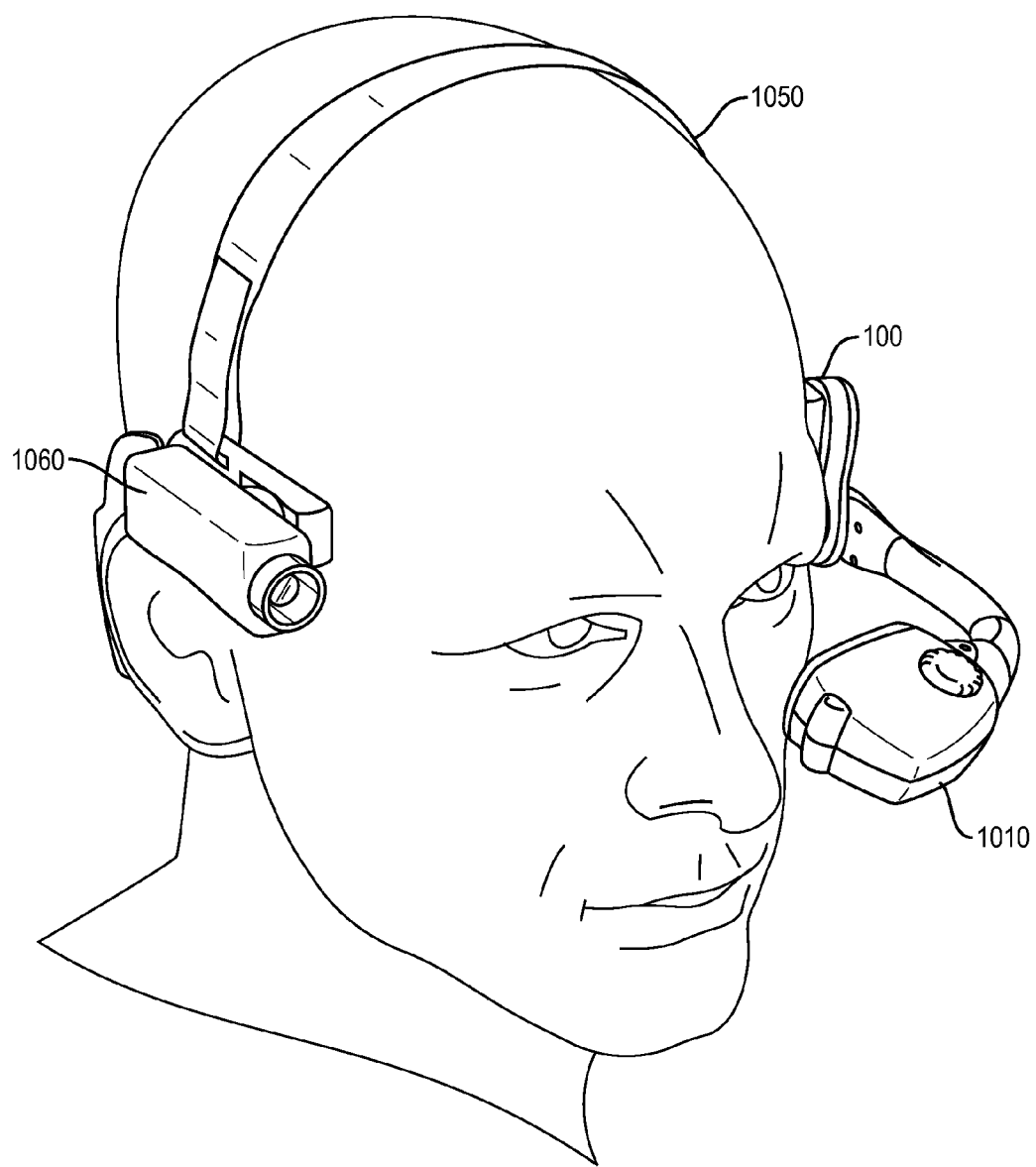
FIG. 2 is another perspective view showing the HMD system as worn on the user's head with a camera peripheral installed.

FIG. 2 is a view of the HMD 100 worn on the head of a user where a camera accessory 1060 has been placed in the port 1020. The camera 1060 can include both audio and video sensing and recording capability and may for example, be in a small form factor similar to a "bullet cam". As will be explained further below, user commands, which may be a head motion or voice commands are provided by the user to control the settings of the display 1010, the camera 1020, and to perform other functions.

The HMD system may principally function as either a stand alone personal computer or "smart phone" device and/or as remote control for a host personal computer, or other device. To that end, included in the housing are various electronic circuits, including as will be understood shortly, a microcomputer, one or more wireless interfaces, associated memory or other storage devices, position, motion and/or gesture sensors. The camera position, motion and/or gesture sensors are used to track the position, motion and/or gesture of the users head or hands and the microphone receives audio input commands.

Figure 3:
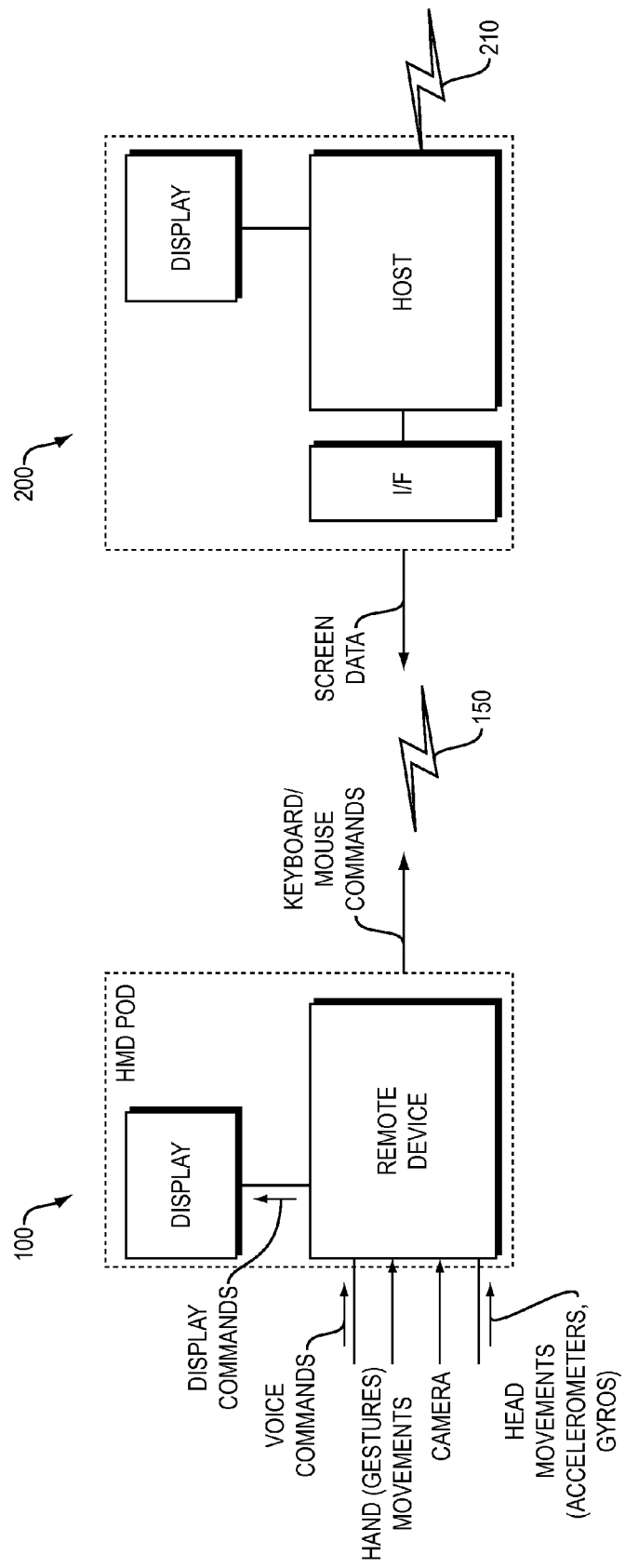
FIG. 3 is a high level functional diagram showing the HMD and its use as a controller for a host processor such as a personal computer.

The wireless interface enables HMD system 100 to be used as a smart phone itself or as a remote control for a host computing device 200 (see FIG. 3). The host 200 may for example, be a laptop, cell phone, RIM Blackberry, Apple iPhone, Google Android or other smart phone device having similar or greater computational complexity and similar or greater network connectivity than the remote control HMD system 100 itself. The host 200 may be further connected to other networks, such as through a Wide Area Network (WAN) connection 210 to the Internet. The HMD system 100 and host 200 are connected to one another through suitable wireless connections, such as are provided by a Bluetooth link or Wireless Local Area Network (WLAN) 150.

As shown in FIG. 3, the HMD system 100 receives inputs from the user such as voice input via the microphone, hand movements via the camera or other optical sensors, and/or head movement inputs via the accelerometers or other head motion tracking circuitry. These are translated by software in system 100 (and/or cooperating with software in host 200) into device 100 and/or host 200 system recognizable commands. If these are commands for HMD system 100, it carries them and if they are command for host 200, they are sent over the Bluetooth and/or WiFi interface 150 to the host 200. The host 200 then interprets these translated commands in accordance with its own operating system/application software to perform various functions.

Among these commands may be a command to fetch and display a document.

Among these commands may be to answer a telephone call.

Among other commands may be to retrieve information from the Internet and display it, such as an email or a web page.

Among other commands may be to select a field of view within a virtual display and then return that selected screen to the remote device. It should also be understood that a very large format to virtual display area may be associated with application software running on or in an operating system running on the host 200 for only a portion of that large virtual display area within the field of view is selected by various voice commands and/or head movements supplied to the display 1010 on the HMD 100.

Further information concerning the functions that can be performed by the HMD 100 in response to detecting voice inputs, motions, and/or gestures are explained in a co-pending U.S. patent application entitled "Remote Control of Host Application Using Motion and Voice Commands" filed May 5, 2010, Ser. No. 12/774,179, and "Wireless Hands-Free Computing Headset with Detachable Accessories Controlled by Motion, Body Gesture, or Vocal Commands" filed Feb. 1, 2011, Ser. No. 13/018,999, the entire contents of each of which are hereby incorporated by reference.

The HMD system 100 may provide other functions to other accessories beyond the camera such as additional speakers, additional cameras, light sources and any other electronic components that may be put into the hot shoe 1020 or battery self powered.

Figure 4:
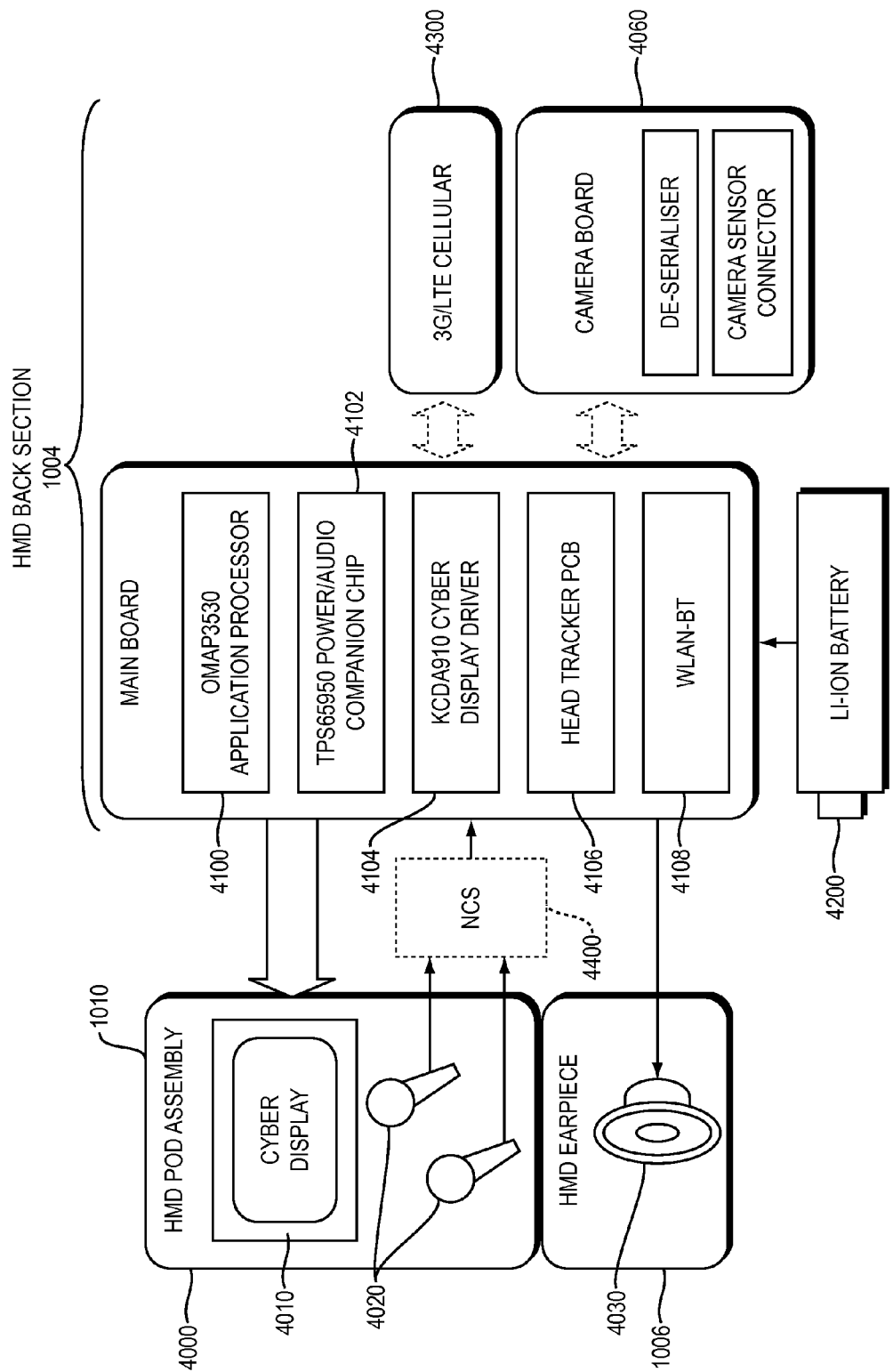
FIG. 4 is a high level block diagram of the components internal to the HMD assembly.

FIG. 4 is a simplified high level block diagram of a non-limiting example embodiment of the HMD system 100. These components are integrated into the HMD housing in various places as shown in FIG. 1. The HMD system 100 may include an eye pod assembly 4000 that includes the aforementioned microdisplay 4010, and one or more microphones 4020. One or more speakers 4030 are positioned in the housing earpiece near the user's ear (see item 1006 in FIG. 1). The system electronics can be placed on or in the frame in an appropriate location (such as back section 1004) and include an Open Media Application Platform (OMAP) processor 4110, a power/audio companion chip 4102, a display driver 4104, a head tracker 4105, a circuit board 4106 and wireless LAN/Bluetooth interface 4108. Also located in the housing is a power source, such as a lithium ion battery 4200.

The head tracker circuitry 4106 may include circuits to detect head movements and gestures such as lateral movements along and rotation gestures around the X, Y and Z axes using Hall effect sensors, MIM diodes, accelerometers, gyros and/or transducers.

HMD system 100 may also receive inputs from external input devices such as a wireless mouse, track ball, or keyboard that may be wirelessly connected through the Bluetooth interface 4108. Software in the WLAN/BT front end 4108, the OMAP 4100 and/or host may be used to interpret hand gestures detected by the camera. A camera board 4060 may optionally provide video input.

The OMAP processor may include a central processing unit, and on-chip memory such as Random Access Memory (RAM) that may include non volatile memory and/or Read Only Memory (ROM). The OMAP may be a Texas Instruments model OMAP 3530 processor or newer version sold by Texas Instruments, Inc. and used a multimedia processor. The OMAP is generally a more powerful, and more power consuming processor then the WLAN/BT interface 4108.

In this example, a TPS 65950 power/audio companion chip also available from Texas Instruments, provides audio, USB, keypad control and battery charging functions to the system.

The WLAN/BT interface 4108 may be a model LBEE 1W8 NEC-interface circuit or newer radio module with similar or greater capabilities.

The display driver may be a model KCD-A 910 display driver available from Kopin Corporation of Westborough, Mass.

The microdisplay 4010, also available from Kopin, can include models 113LV, 152LV, 230LV, WQVGA, or other manufactures acceptable micro-displays.

An NCS module 4400 processes the received microphone signals to provide voice recognition functions and produce an audio signal to the audio companion chip 4102.

Figure 5:
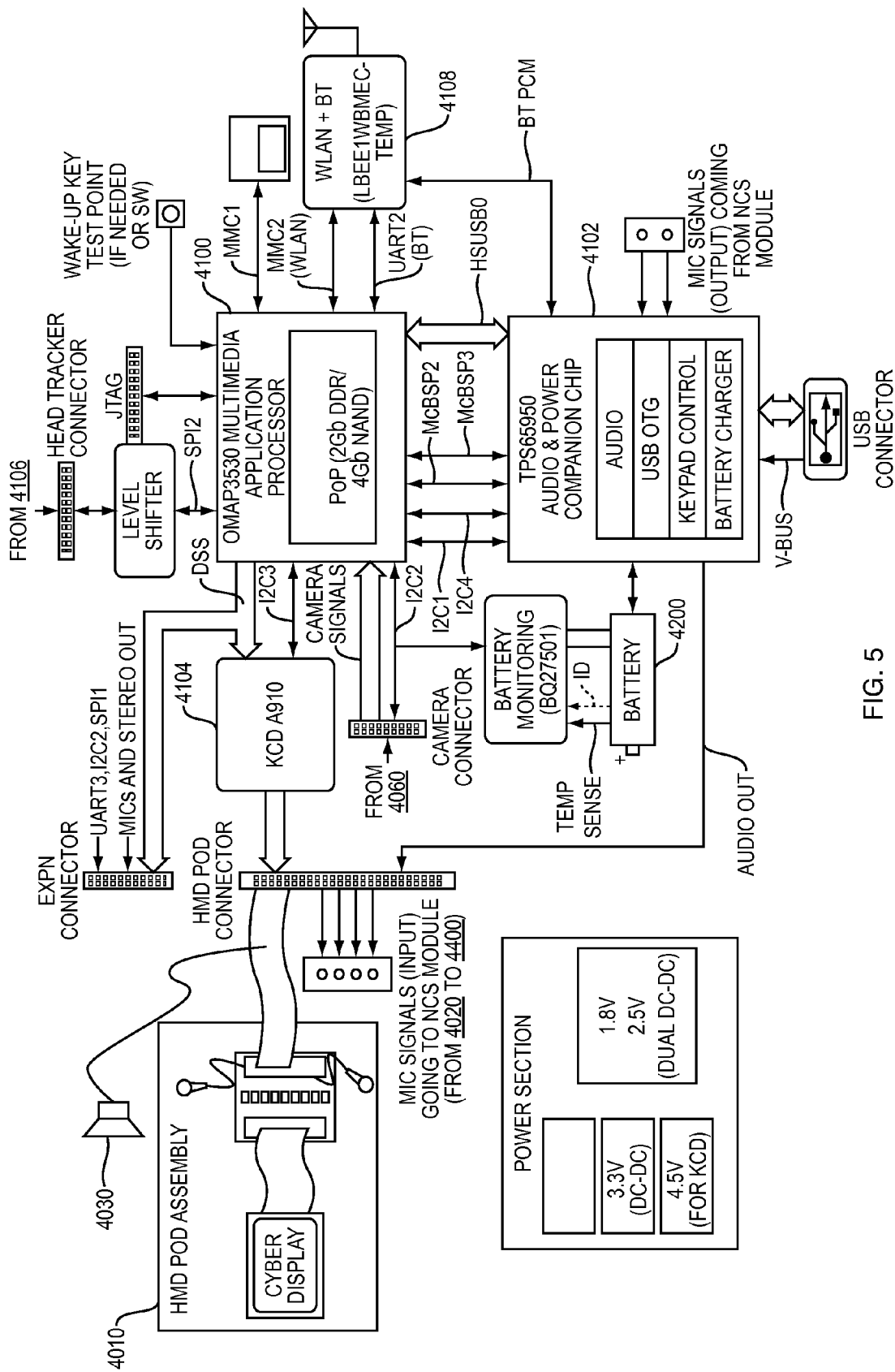
FIG. 5 is a more detailed diagram showing the electronic components used in one particular embodiment.

FIG. 5 is a more detailed block diagram showing the connectivity between the various components of FIG. 4.

As can be more readily seen from this drawing, the WLAN/BT front end 4108 can be use a UART interface. It is programmed to control the power on or power off state of the OMAP processor 4100 and accordingly the audio and power companion chip 4102 and the power applied to other peripheral functions such as the camera, display, WLAN modem, etc.

Figure 6:
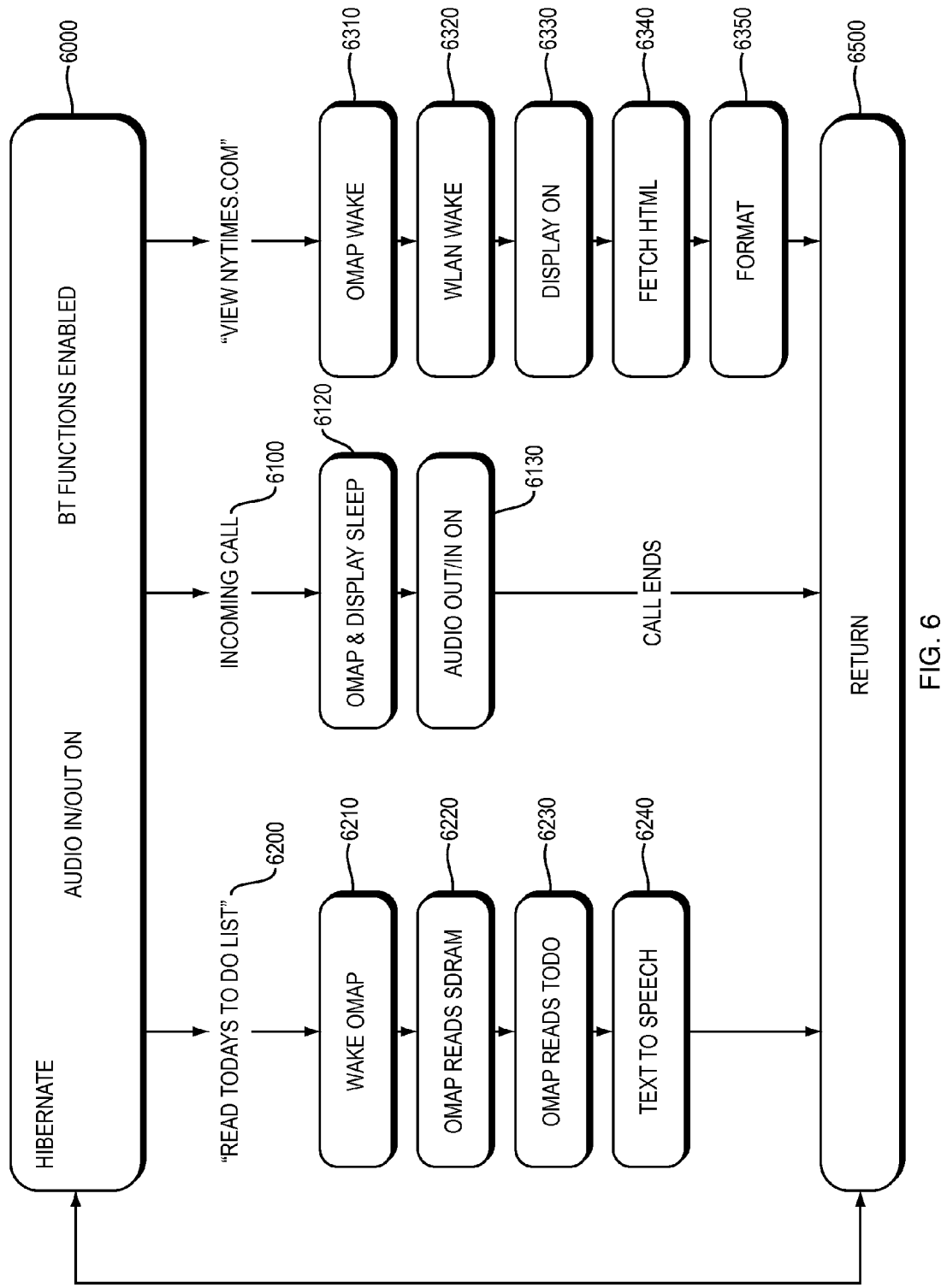
FIG. 6 is a high level flow diagram showing one example of how the Bluetooth front end acts as a system controller to control when various other HMD system components become active.

FIG. 6 is a flow chart illustrating a few example functions where the WLAN/Bluetooth front end 4108 may control application of power to other system components. FIG. 7 is an example table that may be kept by front end 4108 to determine when to power on/power off various devices, and should be referred to in the discussion of FIG. 6 that follows.

In a first example, in state 6000, the system components may initially be in a hibernate mode with only the Bluetooth headset functions (e.g. microphone 4020 and speaker 4030) enabled. This state 6000 may be entered when the HMD system 100 is first switched on. Thus, for example, in state 6100, if an incoming telephone call occurs, the audio input and output functions remain active in state 6110 (e.g. leaving microphones 4020 on and enabling speaker 4030). But in state 6120 the OMAP 4100, display 4010, camera 4060 and other component remain in a hibernate mode. When the call is ended, processing returns to state 6000.

In another example, from the hibernate state 6000, the audio circuitry may detect a specific user voice command, such as "read my to-do list". From this state 6200, the OMAP is enabled in state 6210. The OMAP, in state 6220, may then access a local storage area such as an SDRAM memory to access a file which is associated with the user's local task list to obtain an itemized list of tasks to do for the present day. The to-do list data is returned from the OMAP 4100 to the audio interface in state 6240 where the to-do list text is converted to speech and then heard on the speakers of the headset 100. Once this function completes, a state 6500 is entered where the system then returns to the hibernate state 6000, where the system again functions only as a Bluetooth headset, awaiting another user command.

In a further example, in state 6300 a user speaks a command indicating that she wishes to view the view the New York Times homepage at www.NYTimes.com. On receipt of this command, in state 6310 the OMAP is enabled. A WLAN interface is activated enabling the OMAP to issue commands to the host processor, such as was described in connection with FIG. 3, to obtain the HTML content for the New York Times homepage. At some point as state 6330 is entered where the microdisplay 1010 is also enabled, anticipating that the user wishes to display a webpage. The HTML webpage for the New York Times. com can be fetched in other ways, such as for example, if the headset itself had the ability to access the Internet through an onboard Bluetooth, WLAN circuit (Wi Fi) or through auxiliary cellular modems. In any event, once the content is obtained, it is then formatted in state 6350 and displayed on the microdisplay. At some point the user may issue another command to disable the display (or the command may time out), at which point the hibernate function 6000 is again entered.

Thus, when the Bluetooth and/or WiFi front end detects an incoming audio stream with a user voice command, the Bluetooth and/or WiFi circuit automatically wakes up the OMAP and other peripheral devices but only those many as are actually necessary to carry out the command. The Bluetooth and/or WiFi front end thus retains information, such as in the form of a table or database entries, indicating which peripheral devices and/or OMAP need to be energized, if any, to carry out each of many different user commands.

In yet another example (See FIG. 7) user hand gestures may be detected by the camera and provide input to control the application of power to specific components of the system 100. In this state, the audio components are initially enabled, but detect a spoken command to read and interpret hand gestures by activating at least camera 4060 and OMAP 4100.

In another example, the user may use head movements as an input. In this mode, it is possible that only the head motion tracking 4106 and display are related components enabled, such as when the user is using head movements to pan, zoom, or otherwise navigate a large format virtual display area.

As such functions of the HMD system are controlled via appropriate spoken commands, gesture commands or commands from a host computer, and interpreted by the Bluetooth and/or WiFi interface, waking up only that portion of the subsystem electronics as required. When the activity is finished, another spoken command or time out can return the HMD system back to the sleep mode. At this point, the Bluetooth and/or WiFi circuit goes back into a hibernation state waiting for an external contact signal, such as a phone call, another voice command, or computer interface command via the WLAN.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A method for controlling a head mounted display (HMD) system that includes a microdisplay, a user input device, a first processor, and two or more other peripheral circuits comprising:
   entering a first state by enabling only the first processor and user input device;
   detecting a user input;
   interpreting, with the first processor, the user input as a spoken command or gesture command; and
   entering a second state by the first processor issuing a command enabling a selected ones of the two or more other peripherals and the first processor issuing a command disabling other peripherals based on the spoken command or gesture command;
   wherein the two or more peripherals include a second processor, the second processor configured to consume more power relative to the first processor.

2. The method of claim 1 wherein the two or more other peripherals are selected from a group consisting of a wide area network interface, the second processor, a display, a camera and a head motion tracker.

3. The method of claim 1 wherein the user input is the spoken command, and the spoken command is to access a document, and in the second state, power is applied to the second processor and microdisplay, and the document is then displayed.

4. The method of claim 3 wherein the user input is the spoken command, and the spoken command is to access a webpage, and the second state further enables a wireless interface to connect to a network to fetch the webpage.

5. The method of claim 1 wherein the peripherals include a camera and the second processor is further enabled in the first state, the user input is a hand gesture, and the second processor is configured to interpret the hand gesture prior to entering the second state.

6. The method of claim 5 wherein the user input is a request to manipulate an aspect of the display, and the second state modifies presentation of information on the display.

7. The method of claim 1 wherein the peripherals include a wireless interface, and the second state transmits the user command over the wireless interface to a host.

8. A headset portable apparatus comprising:
   a microdisplay, for displaying visual information;
   a user input device that provide a user input;
   two or more peripheral devices that provides one or more peripheral input signals indicating a sensor input or at least one of a user motions from a user and /or vocal input from the user, wherein the two or more peripheral devices are disabled in a first state;
   a first processor configured to translate the user input into one or more detected commands, only the first processor and the user input device enabled in the first state; and
   a processor controller, for selectively enabling and /or disabling the microdisplay and one or more of the peripheral based on the one or more detected commands;
   wherein the tow or more peripheral include a second processor, the second processor configured to consume more power relative to the first processor.

9. The apparatus of claim 8 wherein the one or more peripheral devices comprise:
   one or more microphones, for receiving audio signals from the user; and
   wherein the first processor further comprises a speech recognizer, for processing audio signals to detect vocal commands.

10. The apparatus of claim 8 wherein the one or more peripheral devices is a motion detector and the motion detector provides two or more motion inputs indicative of the user motion, the user motion being along two or more axes.

11. The apparatus of claim 10 wherein the motion detector is a camera for detecting hand and/or body gesture movements of the user.

12. The apparatus of claim 10 wherein the motion detector is a head movement tracking device for detecting head movements of the user.

13. The apparatus of claim 8 wherein the peripherals further comprise a communication interface providing one or more wireless links between the headset portable apparatus and another data processing device.

14. The apparatus of claim 8 wherein the first processor is configured to process the detected commands to control aspects of presentation of visual information on the microdisplay.

15. The apparatus of claim 14 wherein the detected commands control a field of view.

16. The apparatus of claim 15 wherein the detected commands control a zoom, pan, or scale factor.

17. The apparatus of claim 14 wherein the detected command selects a hyperlink item in a web page display.

* * * * *

UNITED STATES PATENT AND TRADEMARK OFFICE
CERTIFICATE OF CORRECTION

PATENT NO. : 8,736,516 B2  
APPLICATION NO. : 13/232622  
DATED : May 27, 2014  
INVENTOR(S) : Jeffrey J. Jacobsen, Christopher Parkinson and Stephen A. Pombo Page 1 of 1

It is certified that error appears in the above-identified patent and that said Letters Patent is hereby corrected as shown below:

In the Claims

In Column 7, Claim 8, line 18, delete "tow" and insert -- two --.

Signed and Sealed this
Fifth Day of August, 2014

Michelle K. Lee
*Deputy Director of the United States Patent and Trademark Office*